United States Patent
McDonald et al.

(10) Patent No.: US 12,248,894 B2
(45) Date of Patent: Mar. 11, 2025

(54) SUPPLEMENTAL SAFETY SYSTEM AND METHOD FOR USE OF SAME

(71) Applicant: RailPros Field Services, Inc., Irving, TX (US)

(72) Inventors: James McDonald, Irving, TX (US); Chad Smith, Irving, TX (US)

(73) Assignee: RailPros Field Services, Inc., Irving, TX (US)

( * ) Notice: Subject to any disclaimer, the term of this patent is extended or adjusted under 35 U.S.C. 154(b) by 0 days.

(21) Appl. No.: 17/621,628

(22) PCT Filed: Jun. 29, 2020

(86) PCT No.: PCT/US2020/040182
§ 371 (c)(1),
(2) Date: Dec. 21, 2021

(87) PCT Pub. No.: WO2020/264520
PCT Pub. Date: Dec. 30, 2020

(65) Prior Publication Data
US 2022/0351115 A1    Nov. 3, 2022

Related U.S. Application Data

(60) Provisional application No. 62/868,389, filed on Jun. 28, 2019.

(51) Int. Cl.
G06Q 10/00      (2023.01)
G06Q 10/0631    (2023.01)
G06Q 10/1093    (2023.01)

(52) U.S. Cl.
CPC .  *G06Q 10/063118* (2013.01); *G06Q 10/1093* (2013.01)

(58) Field of Classification Search
None
See application file for complete search history.

(56) References Cited

U.S. PATENT DOCUMENTS

| | | |
|---|---|---|
| 5,416,996 A | 5/1995 | Clemens |
| 5,485,693 A | 1/1996 | Frenken |

(Continued)

FOREIGN PATENT DOCUMENTS

| | | |
|---|---|---|
| AU | 2005202184 | 5/2005 |
| CN | 201514740 | 6/2010 |

(Continued)

OTHER PUBLICATIONS

Qureshi, M. (2012). Requirements and the baseline plan. arXiv preprint arXiv:1201.4500. (Year: 2012).*

(Continued)

*Primary Examiner* — Matheus Ribeiro Stivaletti
(74) *Attorney, Agent, or Firm* — Scott Griggs; Griggs Bergen LLP

(57) ABSTRACT

A supplemental safety system (10) and a method for use of the same are disclosed. In one embodiment of the system (10) a safety site plan (18) of a site and a safety site schedule (20) for the site are utilized. The safety site plan (18) includes a site plan of the site augmented with locationing information for work with a project geofence (58) therearound. The safety site schedule (20) for the site includes a work schedule for the site augmented with schedule data relative to a project pre-work phase (72), a project work phase (74), and a project post-work phase (76). The safety site plan (18) and the safety site schedule (20) are utilized to provide safety as a project advances from project pre-work (72) to project work (74) to post- work (76).

11 Claims, 8 Drawing Sheets

(56) References Cited

U.S. PATENT DOCUMENTS

| | | | |
|---|---|---|---|
| 5,918,924 | A | 7/1999 | Cowan |
| 6,065,232 | A | 5/2000 | Haughey |
| 6,128,841 | A | 10/2000 | Werner |
| 6,148,555 | A | 11/2000 | Beauchamp |
| 6,157,322 | A | 12/2000 | Anderson |
| 6,178,675 | B1 | 1/2001 | Strother |
| 6,209,598 | B1 | 4/2001 | Petrey |
| 6,594,930 | B1 | 7/2003 | Strauss |
| 6,702,351 | B2 | 3/2004 | Buring |
| 7,075,427 | B1 | 7/2006 | Pace |
| 7,121,026 | B2 | 10/2006 | Chen |
| 7,163,108 | B2 | 1/2007 | Lyons |
| 7,333,277 | B1 | 2/2008 | Chen |
| 7,571,559 | B2 | 8/2009 | Olsson |
| 7,624,952 | B1 | 12/2009 | Bartek |
| 7,882,653 | B2 | 2/2011 | Barlow |
| 7,921,586 | B2 | 4/2011 | Reynolds |
| 8,138,948 | B1 | 3/2012 | Votava |
| 8,250,793 | B1 | 8/2012 | Halula |
| 8,312,676 | B2 | 11/2012 | Maciulewicz |
| 8,477,081 | B2 | 7/2013 | Daniel |
| 9,822,927 | B2 | 11/2017 | Frederick |
| 10,283,019 | B2 | 5/2019 | Ballow |
| 11,328,265 | B1 * | 5/2022 | Givoly ............... G06Q 10/1097 |
| 2003/0236598 | A1 | 12/2003 | Villarreal Antelo |
| 2004/0093777 | A1 | 5/2004 | Park |
| 2005/0178928 | A1 | 8/2005 | Wade |
| 2007/0146152 | A1 | 6/2007 | Welles |
| 2007/0199216 | A1 | 8/2007 | Atkinson |
| 2008/0073169 | A1 | 3/2008 | Walters |
| 2008/0084333 | A1 | 4/2008 | Forrest |
| 2008/0169385 | A1 | 7/2008 | Ashraf |
| 2008/0195312 | A1 | 8/2008 | Aaron |
| 2010/0146830 | A1 | 6/2010 | Large |
| 2011/0006912 | A1 | 1/2011 | Sheardown |
| 2011/0118913 | A1 | 5/2011 | Pretorius |
| 2011/0127389 | A1 | 6/2011 | Bartek |
| 2012/0198739 | A1 | 8/2012 | Venetucci |
| 2012/0320204 | A1 | 12/2012 | Dahlin |
| 2013/0289873 | A1 | 10/2013 | Mitchell |
| 2014/0249877 | A1 * | 9/2014 | Hull ...................... H04W 4/029 |
| | | | 705/7.15 |
| 2014/0330606 | A1 * | 11/2014 | Paget ............... G06Q 10/06311 |
| | | | 705/7.18 |
| 2016/0096538 | A1 * | 4/2016 | Bartek ................... B61L 27/70 |
| | | | 246/28 R |
| 2017/0088046 | A1 | 3/2017 | Denny |
| 2017/0287368 | A1 | 10/2017 | Harter |
| 2018/0181992 | A1 | 6/2018 | Akhavan-Saraf |
| 2018/0247137 | A1 | 8/2018 | Boyle |
| 2019/0138667 | A1 * | 5/2019 | Benesh ................. G06Q 50/08 |
| 2019/0147655 | A1 * | 5/2019 | Galera ................... G06T 15/20 |
| | | | 345/419 |
| 2020/0258056 | A1 * | 8/2020 | Endo ................. G06Q 10/1097 |

FOREIGN PATENT DOCUMENTS

| | | |
|---|---|---|
| CN | 202662247 | 1/2013 |
| CN | 104537837 | 4/2015 |
| CN | 104715625 | 6/2015 |
| CN | 112323673 | 2/2021 |
| EP | 0592208 | 4/1994 |
| JP | 5745928 | 5/2015 |
| KR | 101446063 | 9/2014 |
| WO | 2009055875 | 5/2009 |
| WO | 2018080382 | 5/2018 |
| WO | 2020264462 | 12/2020 |
| WO | 2020264477 | 12/2020 |
| WO | 2020264520 | 12/2020 |

OTHER PUBLICATIONS

Triplesign VMS Solar, https://www.triplesign.com/assets/pdf/Triplesign-VMS-Solar.pdf.

Rotating Panel Billboard, Trivision, Trivision Billboard Advertising, Mobile Billboard, https://www.youtube.com/watch?v=ddPn5AN9vqY.

* cited by examiner

SUPPLEMENTAL SAFETY SYSTEM AND METHOD FOR USE OF SAME

TECHNICAL FIELD OF THE INVENTION

This invention relates, in general, to safety and, in particular, to supplemental safety systems and methods for use of the same for construction, maintenance, and the like, that provide for enhanced operations while avoiding catastrophic events and protecting workers.

BACKGROUND OF THE INVENTION

Without limiting the scope of the invention, the background will be described with reference to maintenance of railway projects, as an example. During the maintenance of railroads, railway worker coordination is essential to maintain safety and protect trains, train crews, contractors, and anyone performing work within a railway right-of-way. Critical to maintaining safety during maintenance is effective worker communication from before the project begins through the project to post-project. Typically, railway workers rely on a combination of manual logs and disparate computer systems to manage the repairs. These practices have been in place for decades despite technology improvements in many other areas. As a result, there is a need for improved supplemental safety systems.

SUMMARY OF THE INVENTION

It would be advantageous to mitigate the risks of manual logs and disparate computer systems in the railway industry and other construction and maintenance operations, for example. It would also be desirable to enable a computer-based solution that provides supplemental safety while being easily and quickly deployed without the need for a complex technical analysis. To better address one or more of these concerns, a supplemental safety system and a method for use of the same are disclosed. In one embodiment of the system, a safety site plan of a site and a safety site schedule for the site are utilized. The safety site plan includes a site plan of the site augmented with locationing information for work with a project geofence therearound. The safety site schedule for the site includes a work schedule for the site augmented with schedule data relative to a project pre-work phase, a project work phase, and a project post-work phase. The safety site plan and the safety site schedule are utilized to provide safety as a project advances from project pre-work to project work to post-work.

In one embodiment of the method, a safety site plan of a site and a safety site schedule for the site are created. In response to the safety site schedule being in a project pre-work phase, elements for the project work phase are calendared and the elements of the project work phase are periodically sent reminders. In response to the safety site schedule being in the project work phase, attendance of the elements is verified within the project geofence and workflow updates relative to the elements within the project geofence are received. In response to the safety site schedule being in the project post-work phase, clearance of the elements from the project geofence is verified and work completion updates are received relative to the plurality of elements within the project geofence. This supplemental safety system and the method for use of the same as well as other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of several specific ways to make and use the invention, and do not delimit the scope of the present invention.

Figure 1:
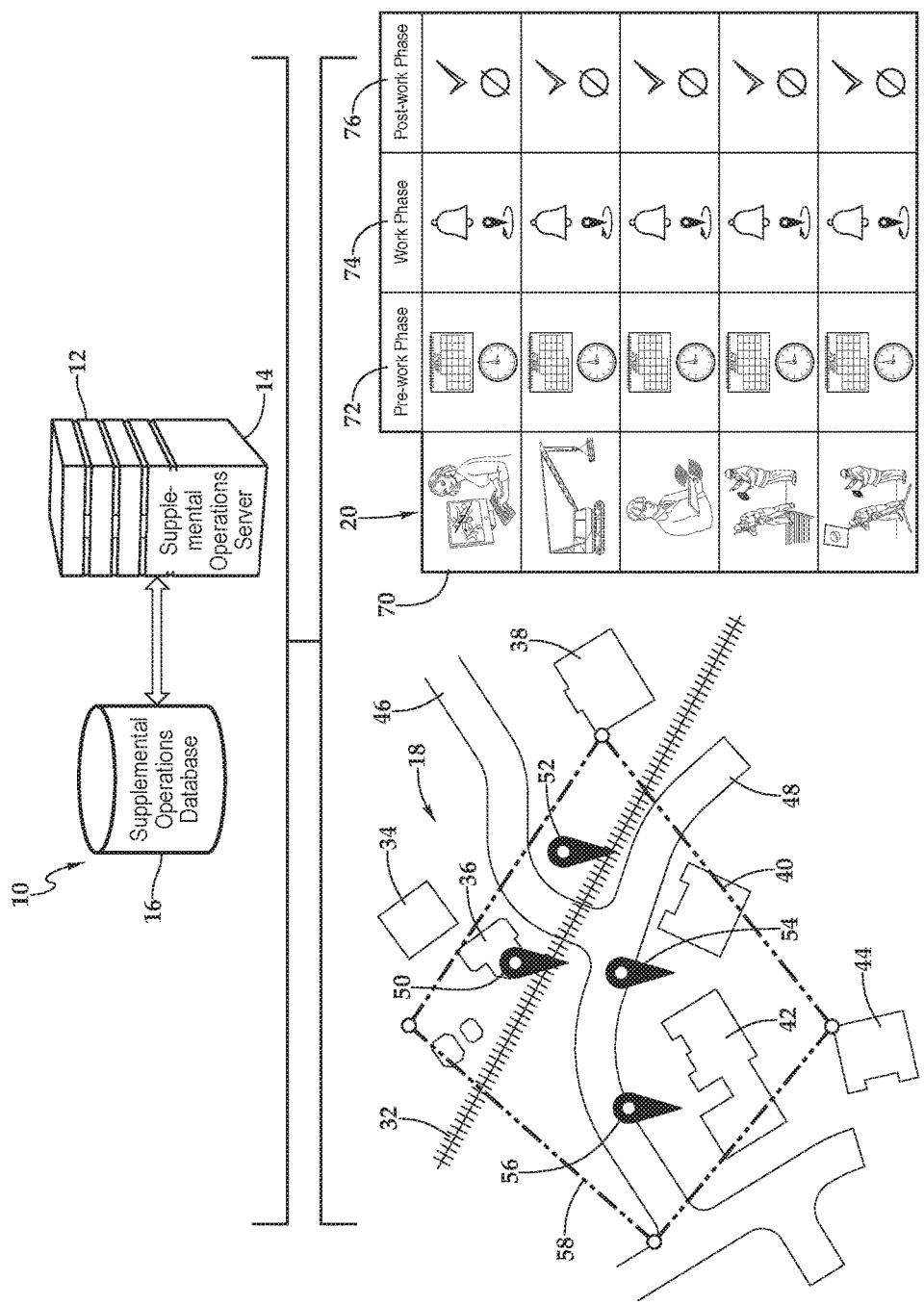
FIG. 1 is a schematic block diagram depicting one embodiment of a supplemental safety system being utilized for a site, according to the teachings presented herein.
Figure 2A:
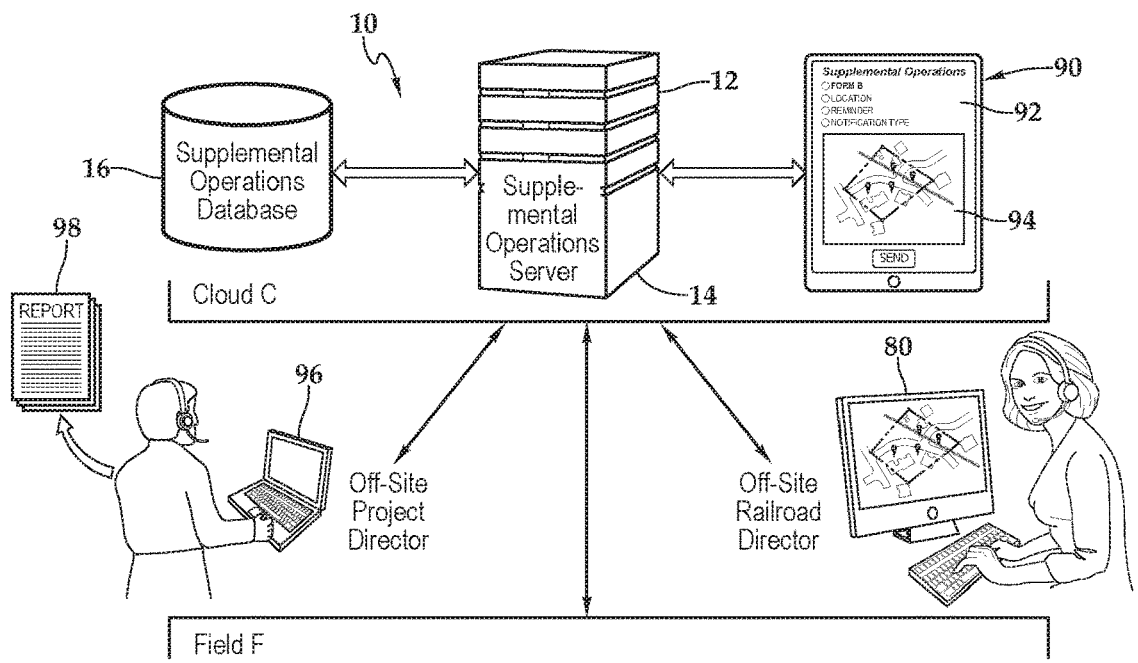
FIG. 2A is a schematic block diagram depicting one embodiment of the supplemental safety system utilizing a safety site plan of the site during a pre-work phase.
Figure 2A:
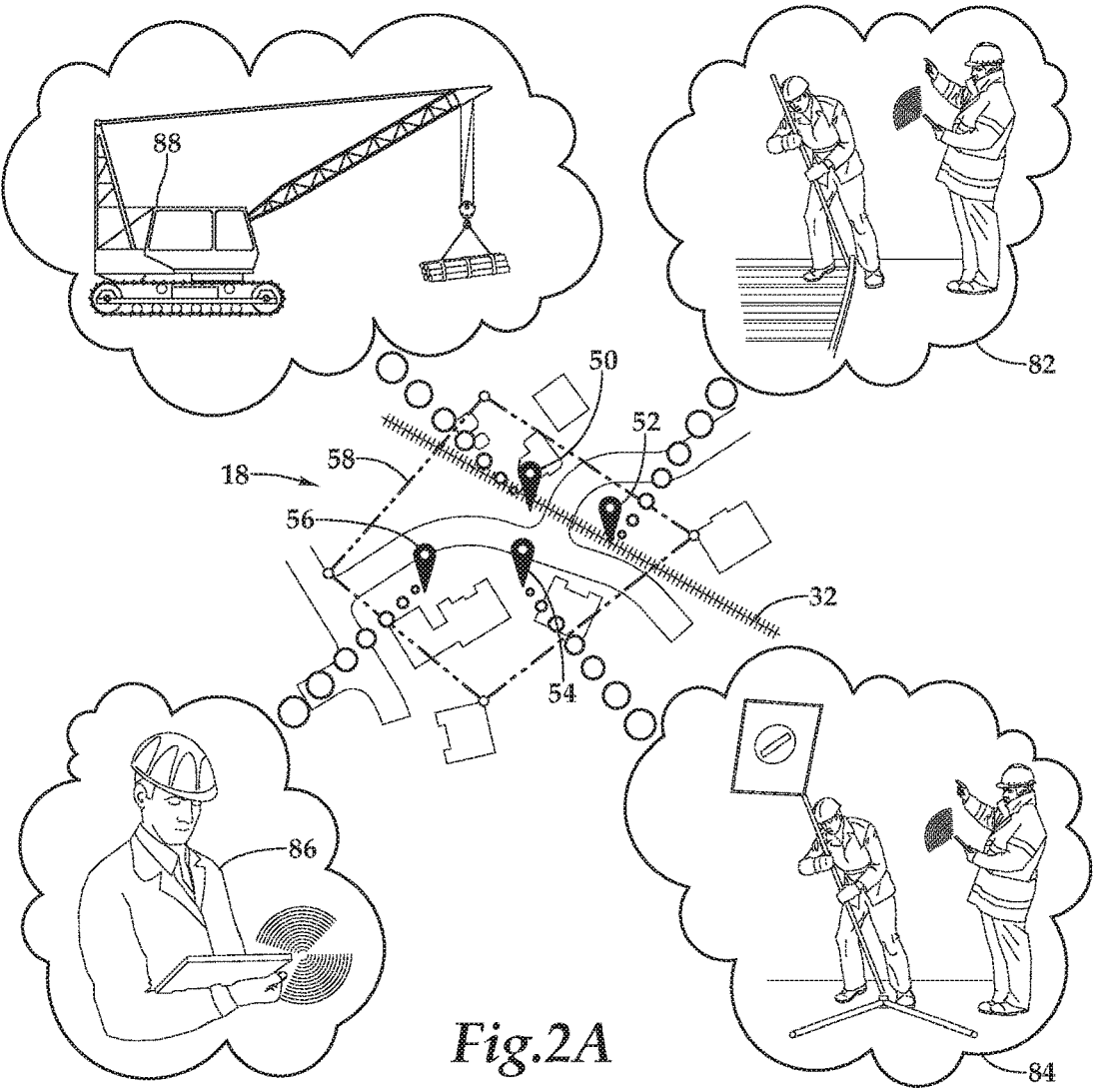
Figure 2B:
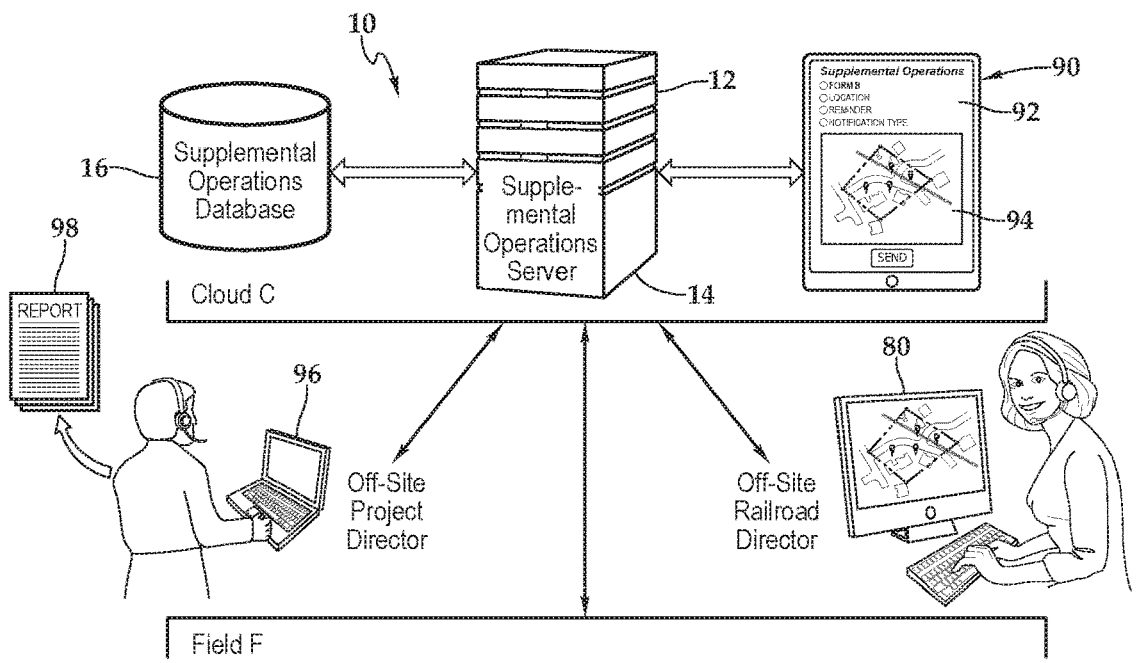
FIG. 2B is a schematic block diagram depicting one embodiment of the supplemental safety system utilizing the safety site plan of the site during a work phase.
Figure 2B:
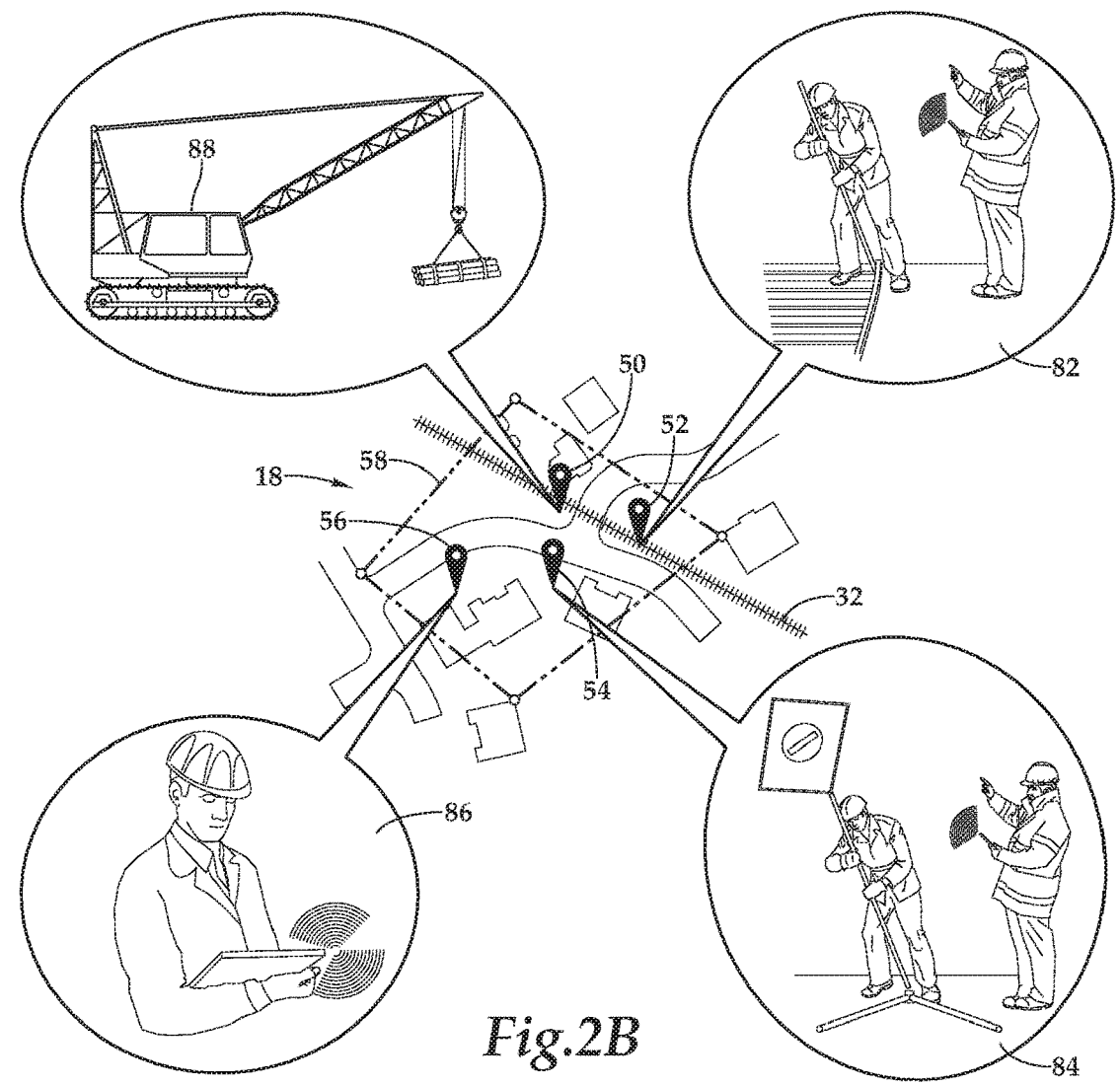
Figure 2C:
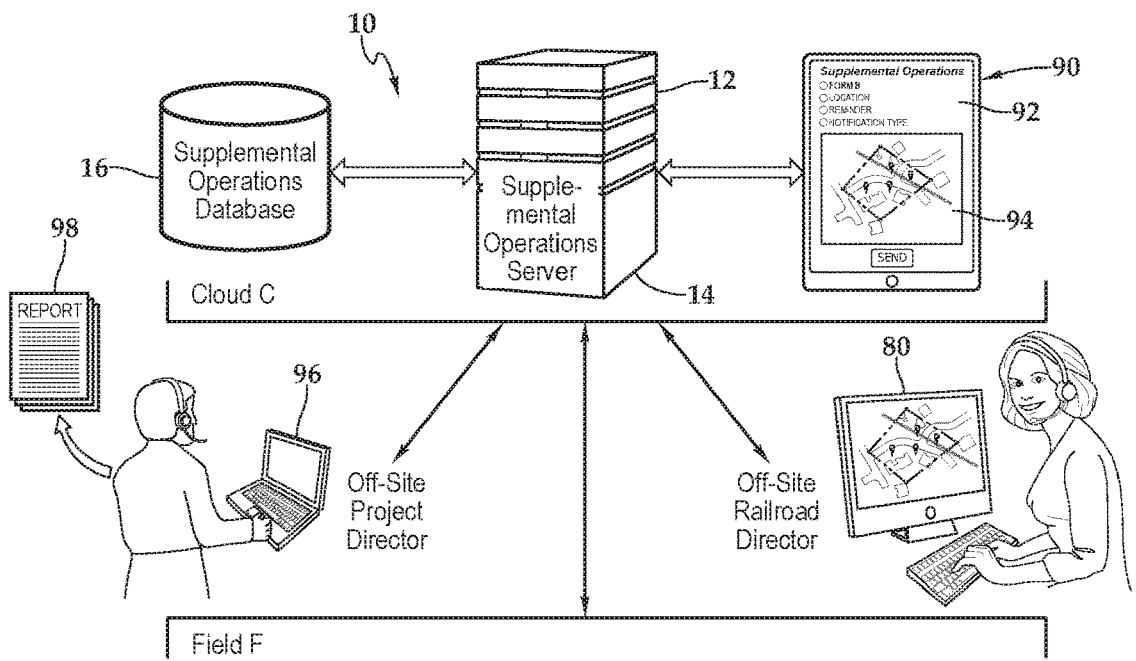
FIG. 2C is a schematic block diagram depicting one embodiment of the supplemental safety system utilizing the safety site plan of the site during a post-work phase.
Figure 2C:
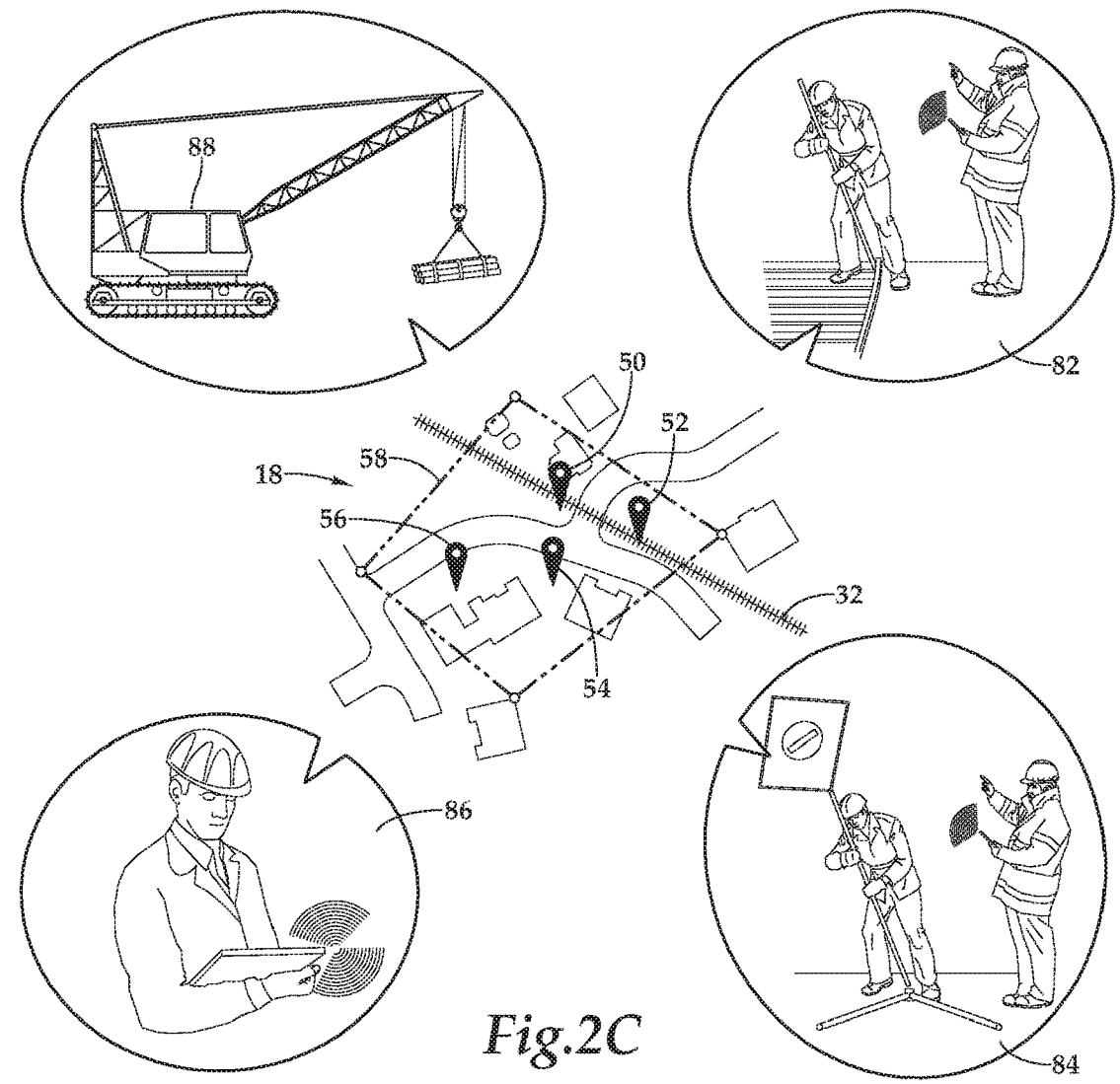
Figure 3:
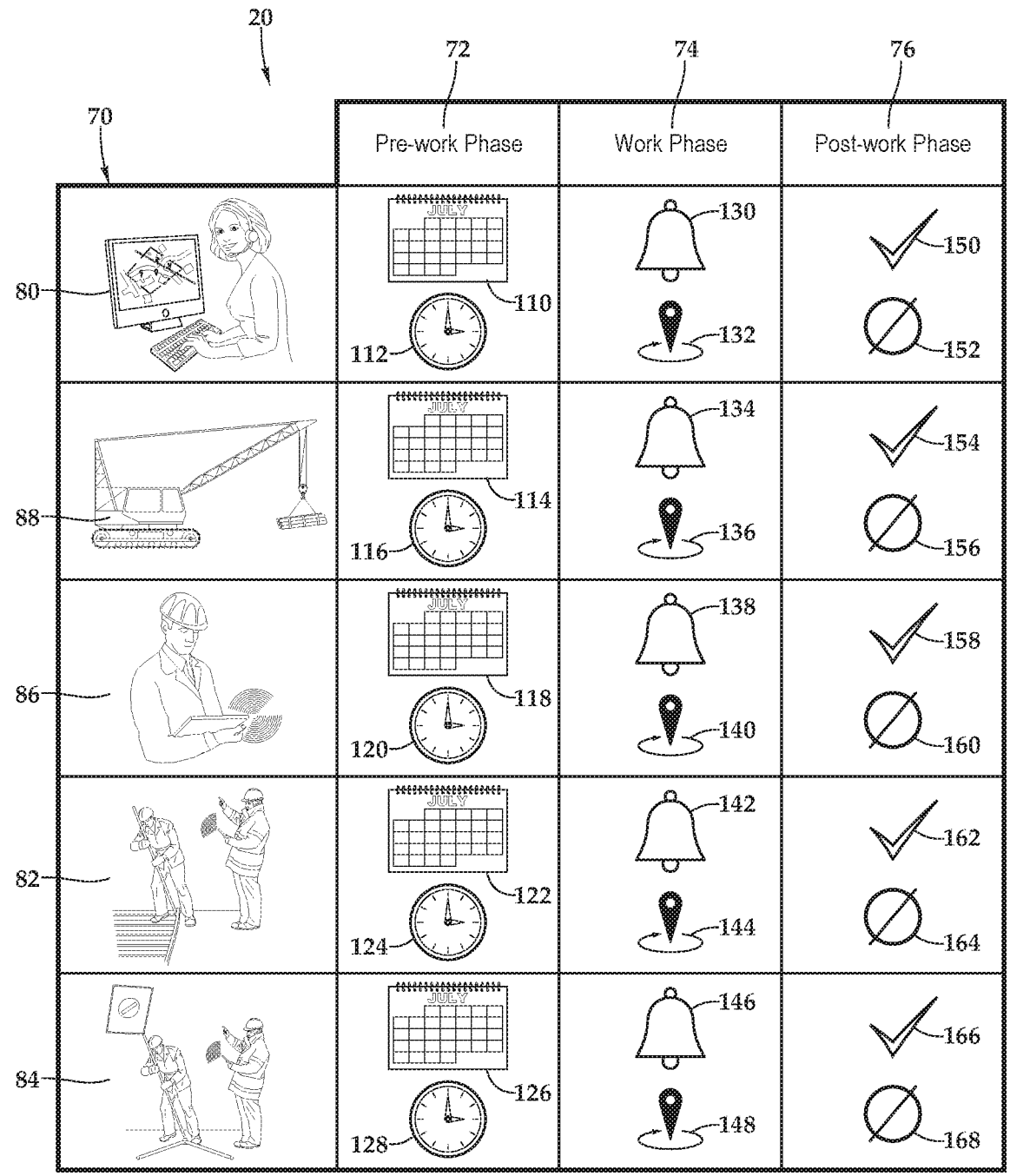
FIG. 3 is a schematic block diagram depicting one embodiment of the supplemental safety system utilizing a safety site schedule.

Referring initially to FIG. 1, therein is depicted one embodiment of a supplemental safety system that is schematically illustrated and generally labeled 10. A supplemental operations server 12 having a housing 14 has access to a supplemental operations database 16, where a safety site plan 18 of a site (see field F in FIG. 2A through 2C) and a safety site schedule 20 of the site are maintained. The safety site plan 18 may be a computer generated view of a site plan of the field F. The computer generated view may be embodied on the supplemental operations server 12 and the supplemental operations database 16. In the safety site plan 18, a location of an existing railroad 32 is shown. In the example presented herein, the railroad 32 is requiring maintenance. Locations of existing structures 34, 36, 38, 40, 42, 44 are shown in the safety site plan 18. Additionally, existing roads 46, 48 are shown. Locations 50, 52, 54, 56 designate places where elements will be deployed to complete the maintenance on the railroad 32. A project geofence 58, which is a virtual boundary around the site, is provided.

The safety site schedule 20 includes a work schedule for the site augmented with elements 70 and schedule data relative to a project pre-work phase 72, a project work phase 74, and a project post-work phase 76. The elements 70 may relate to an industry such as agricultural, manufacturing, construction, oil and gas, railway, railroad, transportation, or service, for example. More particularly, the elements 70 may be project directors, project managers, field crewmembers, construction equipment, maintenance equipment, railroads, or utilities, for example. The safety site plan 18 and the safety site schedule 20 are utilized to provide safety as a project, such as the maintenance of the railroad 32, advances from the project pre-work phase 72 to the project work phase 74 to the project post-work phase 76.

Referring now to FIG. 2A, FIG. 2B, FIG. 2C, and FIG. 3, the supplemental safety system 10 embodies project management and safety techniques to manage schedules, coordinate resources, define deliverables of product or services, and ensures the quality and timeliness of the deliverables to safely complete maintenance, construction, and the like. As shown the work progresses through a pre-work phase 72 (FIG. 2A) to a work phase 74 (FIG. 2B) to a post-work phase 76 (FIG. 2C) with the use of the safety site plan 18 and the safety site schedule 20. During the pre-work phase 72, elements 70 are identified, which for the repair of the railroad 32 at the site in the field F, include a railroad as represented by an off-site railroad director 80, a railway field crew 82, a board signage crew 84, an on-site project manager 86, and heavy equipment crew 88. It should be appreciated, however, that although five elements are utilized in this example, any number and scope of elements may be employed and are within the teachings presented herein.

Each of the elements 70, such as the off-site railroad director 80, the railway field crew 82, the board signage crew 84, the on-site project manager 86, and the heavy equipment crew 88, utilize a smart device for interfacing with the supplemental operations server 14 and the supplemental operations database 16, which may be remotely located and may be located in a cloud C. It should be appreciated, however, that the supplemental operations server 12 may be located in any remote location, including non-cloud-based locations. Such smart device capability is represented by the smart device 90 having a display 92 with data 94 to access the safety site plan 18 and the safety site schedule 20.

As shown, the project may be directed by an off-site project director 96 that has the ability to generate various reports 98. The off-site project director 96 may run the various reports 98 to give visibility into how the elements 70 are functioning. This can also identify any potential hazardous operations or risks in order to prevent accidents.

During the pre-work phase 72, the supplemental safety system 10 identifies needed elements 70 and assigns tasks and geo-specific locations within the site. By way of example, the off-site railroad director 80 handles the temporary suspension of railway service on the railroad 32. The railway field crew 82 is assigned work location 52 on the railroad 32. The board signage crew 84 is assigned work location 54 at the intersection of roads 46, 48. The heavy equipment crew 88 is assigned the delivery of needed supplies to location 50. The supplemental safety system 10 coordinates calendars during the pre-work phase 72 as shown by the calendar coordination operations 110, 114, 118, 122, and 126 with reminders 112, 116, 120, 124, and 128. More specifically, the off-site railroad director 80 receives the calendar coordination 110 and the reminder 112; the railway field crew 82 receives the calendar coordination operations 122 and the reminders 124; the board signage crew 84 receives the calendar coordination operations 126 and the reminders 128; the on-site project manager 86 receives the calendar coordination operations 118 and the reminders 120; and the heavy equipment crew 88 receives the calendar coordination operations 114 and the reminder 116.

With respect to the smart devices utilized by the elements 72 with the smart device 90 as an example, the data 94 presents the elements 70 with information about when reminders regarding the work will occur as well as the notification types that will be utilized. The notification types include, but are not limited to, "in-app" notices, which are audio, visual, or audio visual or "out-app" notices, which may be text messages, emails, or telephone calls, for example. Further, the safety site schedule 20 may be integrated into a calendar associated with the smart device 90. The data 94 also presents the elements 70 with information about when reminders regarding establishment and any known disestablishment will occur as well as the notification types that will be utilized.

Once the pre-work phase 72 is complete, the work at the site progresses to the work phase 74, where, in one operational implementation, the elements 70 in the field F utilize the respective smart devices, represented by the smart device 90, as part of a program to complete the work and maintain communication, wherein the smart device 90 offers an application that accesses the safety site plan 18 and the safety site schedule 20 from the supplemental operations server 12.

As the elements arrive to the site at the field F and as work is completed, the supplemental safety system 10 continues to interact with the field F as shown by the attendance inquiries 130, 134, 138, 142, and 146 with work flow verification 132, 136, 140, 144, and 148. More specifically, the off-site railroad director 80 receives the attendance inquiry 130 and the work flow verification 132; the railway field crew 82 receives the attendance inquiry 142 and the work flow verification 144; the board signage crew 84 receives the attendance inquiry 146 and the work flow verification 148; the on-site project manager 86 receives the attendance inquiry 138 and the work flow verification 140; and the heavy equipment crew 88 receives the attendance inquiry 134 and the work flow verification 136. The various transmissions from the field F via the smart device 90 may include GPS data therein.

Once the work phase 74 is complete, the work at the site progresses to the post-work phase 76, where, in one operational implementation, the elements 70 in the field F utilize the respective smart devices, represented by the smart device 90, as part of a program to completely clear the site and confirm the work is completed. As the elements 70 leave the site at the field F and as work is completed, the supplemental safety system 10 continues to interact with the field F as shown by the work completion verifications 150, 154, 158, 162, and 166 with clearance confirmations 152, 156, 160, 164, and 168. More specifically, the off-site railroad director 80 receives the work completion verification 150 and the clearance confirmation 152; the railway field crew 82 receives the work completion verification 162 and the clearance confirmation 164; the board signage crew 84 receives the work completion verification 166 and the clearance confirmation 168; the on-site project manager 86 receives the work completion verification 158 and the clearance confirmation 160; and the heavy equipment crew 88 receives the work completion verification 154 and the clearance confirmation 156. The various transmissions from the field F via the smart device 90 may include GPS data therein.

With respect to the daily operations by the off-site project director 96, as part of a safety protocol, the execution of the safety site plan 18 and the safety site schedule 20 are reviewed and checked and submitted to the supplemental operations server 12 and the supplemental operations database 16 prior to obtaining any necessary signatures or authorization to reopen an area. Any deficiencies may be reviewed by the off-site project director 96. In the event that a condition exists that is considered a safety issue, the off-site project director 96 may contact the on-site project manager 86 or take other necessary action.

Figure 4:
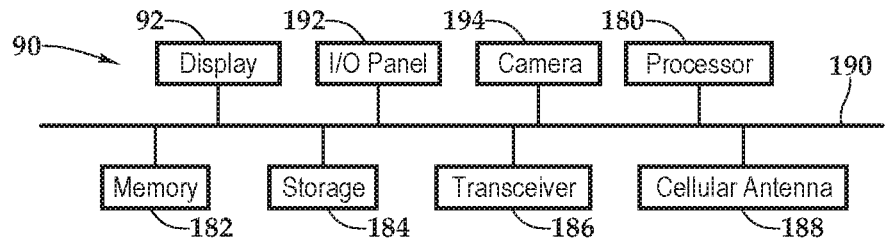
FIG. 4 is a functional block diagram depicting one embodiment of a smart device shown in FIGS. 2A through 2C, which may form a portion of the system.

Referring now to FIG. 4, the smart device 90 employed by any of the elements 70 may be a wireless communication device of the type including various fixed, mobile, and/or portable devices. To expand rather than limit the discussion of the smart device 90, such devices may include, but are not limited to, cellular or mobile smart telephones, tablet computers, smartwatches, and so forth. The smart device 90 may include a processor 180, memory 182, storage 184, a transceiver 186, and a cellular antenna 188 interconnected by a busing architecture 190 that also supports the display 92, I/O panel 192, and a camera 194. It should be appreciated that although a particular architecture is explained, other designs and layouts are within the teachings presented herein.

In operation, the teachings presented herein permit the smart device 90 such as a smart tablet to interface with the safety site plan 18 and the safety site schedule 20, facilitate monitoring and reporting, and receive notifications from the supplemental operations server 12. As shown, the smart device 90 includes the memory 182 accessible to the processor 180 and the memory 182 includes processor-executable instructions that, when executed, cause the processor 180 to execute various instructions.

In one embodiment of processor-executable instructions, the processor-executable instructions cause the processor 180 to receive at least a portion of the safety site plan 18 and the safety site schedule 20. The processor 180 is then caused to at least partially integrate the safety site schedule 20 into a calendar associated with the smart device 90. In one implementation, the processor 180 is caused to periodically receive notifications from the supplemental operations server 14 relative to reminders during the pre-work phase 72, the work phase 74, and the post-work phase 76. Further, the processor 180 may be caused to periodically provide updates relative to tasks and work during the pre-work phase 72, the work phase 74, and the post-work phase 76. The processor-executable instructions may cause the processor 180 to stamp the updates with GPS data from the smart device 90.

Figure 5:
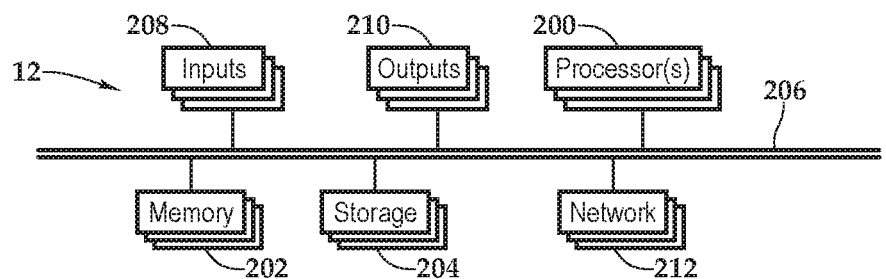
FIG. 5 is a functional block diagram depicting one embodiment of a server shown in FIG. 1, which may form a portion of the system.

Referring now to FIG. 5, one embodiment of the supplemental operations server 12 as a computing device includes, within the housing 14, a processor (or processors) 200, memory 202, and storage 204 interconnected with various buses 206 in a common or distributed, for example, mounting architecture that also supports inputs 208, outputs 210, and a network interface 212. In other implementations, in the computing device, multiple processors and/or multiple buses may be used, as appropriate, along with multiple memories and types of memory. Further still, in other implementations, multiple computing devices may be provided and operations distributed therebetween. The processor 200 may process instructions for execution within the supplemental operations server 12, including instructions stored in the memory 202 or in the storage 204. The memory 202 stores information within the computing device. In one implementation, the memory 202 is a volatile memory unit or units. In another implementation, the memory 202 is a non-volatile memory unit or units. The storage 204 includes capacity that is capable of providing mass storage for the supplemental operations server 12, including supplemental operations database 16 storage capacity. The various inputs 208 and outputs 210 provide connections to and from the supplemental operations server 12, wherein the inputs 208 are the signals or data received by the supplemental operations server 12, and the outputs 210 are the signals or data sent from the supplemental operations server 12. The network interface 212 provides the necessary device controller to connect the supplemental operations server 12 to one or more networks.

The memory 202 is accessible to the processor 200 and includes processor-executable instructions that, when executed, cause the processor 200 to execute a series of operations. The processor-executable instructions cause the processor 200 to provide an interface for various elements utilizing the safety site plan 18 or the safety site schedule 20. The processor-executable instructions also cause the processor 200 to maintain the supplemental operations database 16 in the storage 204. As discussed, the supplemental operations database 16 may include the safety site plan 18 and the safety site schedule 20. In one implementation, the processor-executable instructions cause the processor 200 to, in response to the safety site schedule being in the project pre-work phase 72, calendar elements 70 for the project work phase 74 and periodically remind the elements 70 of the project work phase 74. Further, in response to the safety site schedule 20 being in the project pre-work phase 72, the processor 200 may be caused to re-calendar the elements 70 for the project work phase 74 if one of the elements 70 is unavailable. Moreover, cancelling the elements 70 for the project work phase 74 if one of the plurality of elements 70 is unavailable may occur.

In one implementation of the processor-executable instructions, the processor 200 accesses and analyzes the safety site plan and the safety site schedule and sends a reminder notification, by way of an application, text, or telephone call, for example, to one or more elements, such as a field crewmember, about an upcoming deadline, work-in-progress, or the completion of work, for example.

The processor-executable instructions cause the processor 200 to, in response to the safety site schedule 20 being in the project work phase 74, verify attendance of the elements 70 within the project geofence 58 and receive workflow updates relative to the plurality of elements 70 within the project geofence 58. The processor 200 may be further caused to receive a notification from a particular element and verify attendance of the particular element within the project geofence 58 by analyzing the project geofence 58 and the notification, which includes GPS data. Also, during the project work phase 74, the processor 200 may be caused to receive a notification from the site about the workflow of a particular element and update appropriately update workflow in the supplemental operations database 16.

The processor-executable instructions cause the processor 200 to, in response to the safety site schedule 20 being in the project post-work phase 76, verify clearance of the elements 70 from the project geofence 58, and receive work completion updates relative to the plurality of elements 70 within the project geofence 58. Further, the processor 200 may be caused to receive a notification from a particular element and verify clearance of the particular element from the project geofence 58 by analyzing the project geofence 58 and the notification, which includes GPS data. Similarly, during the project post-work phase 76, the processor 200 may be caused to receive a notification from the site about the work completion of a particular element and update work completion in the supplemental operations database 16.

The processor 200 is caused to receive data from various smart devices and append the data to the supplemental operations database 16. Upon receiving an acknowledgement regarding attendance or work from the smart device of an element, for example, the processor-executable instructions cause the processor 200 to evaluate the acknowledgement of attendance or work and send a verification signal in response. In one embodiment, following the receipt of a signal from a smart device that an incident has occurred, the information and the data stored at the supplemental operations database 16 about the particular project is locked and only accessible by designated parties. Further, the processor 200 is caused to issue reports based on the data in the supplemental operations database 16.

Figure 6:
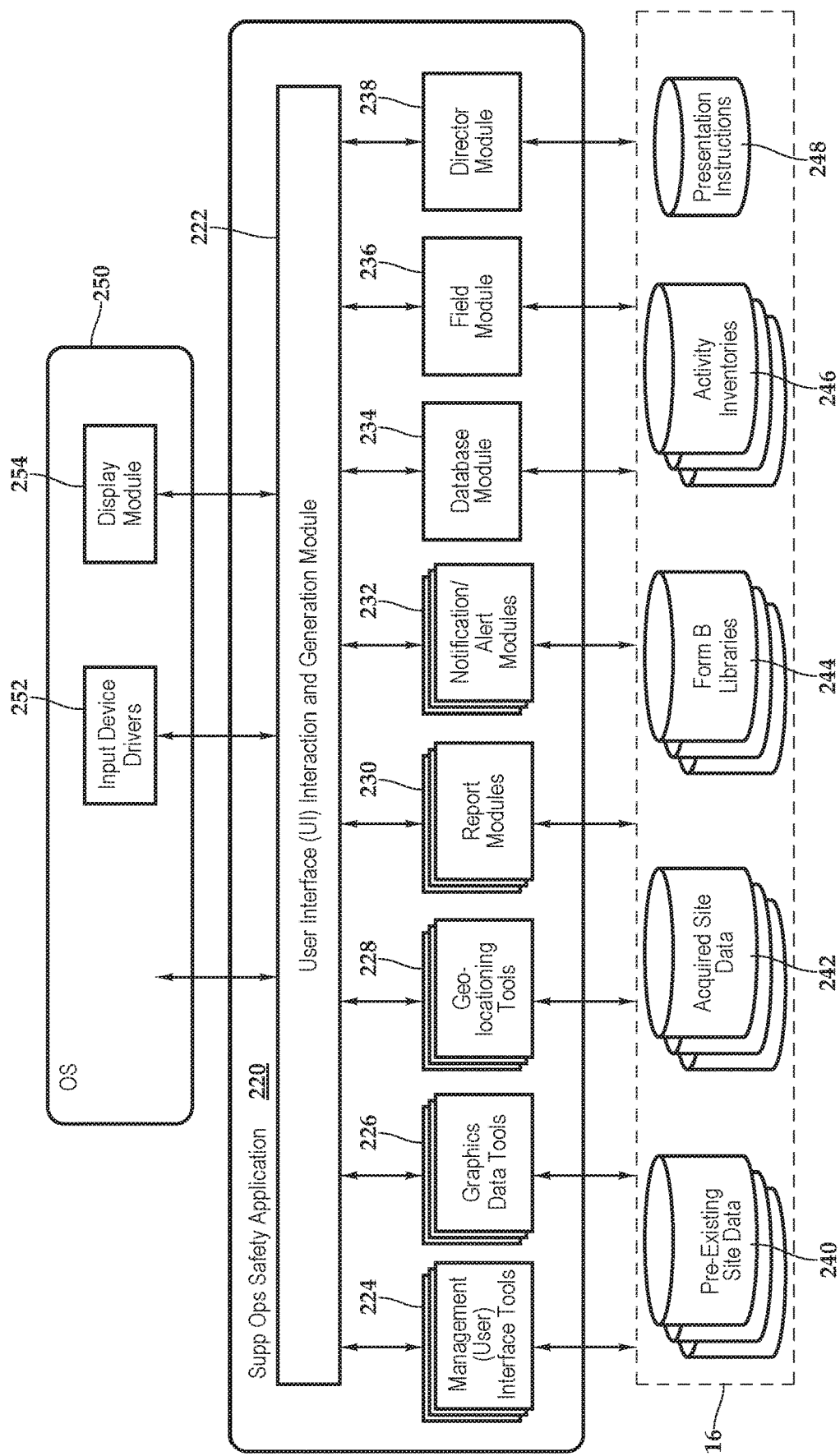
FIG. 6 is a conceptual module diagram depicting a software architecture of a supplemental operations safety application of some embodiments.

FIG. 6 conceptually illustrates the software architecture of a supplemental operations safety application 220 of some embodiments that may render information, such as the safety site plan 18 and the safety site schedule 20, and notifications, such as texts and in-app messages. In some embodiments, the supplemental operations safety application 220 is a stand-alone application or is integrated into another application, while in other embodiments the application might be implemented within an operating system 250. Furthermore, in some embodiments, the supplemental operations safety application 220 is provided as part of a server-based solution or a cloud-based solution. In some such embodiments, the application is provided via a thin client. That is, the application runs on a server while a user interacts with the application via a separate machine or device remote from the server. In other such embodiments, the application is provided via a thick client. That is, the application is distributed from the server to the client machine and runs on the client machine.

The supplemental operations safety application 220 includes a user interface (UI) interaction and generation module 222, management (user) interface tools 224, graphics data tools 226, geolocationing tools 228, the report modules 230, notification/alert modules 232, a database module 234, a field module 236, and a director module 238. The supplemental operations signage safety application 220 has access to the supplemental operations database 16, which in one embodiment, may include pre-existing site data 240, acquired site data 242, Form B libraries 244, activity inventories 246, and presentation instructions 248, which presents instructions for the operation of the supplemental operations signage safety application 220. In some embodiments, storages 240, 242, 244, 246, 248 are all stored in one physical storage. In other embodiments, the storages 240, 242, 244, 246, 248 are in separate physical storages, or one of the storages is in one physical storage while the other is in a different physical storage.

The supplemental operations safety application 220, in one implementation, provides a database of all pertinent information required for a site including, but not limited to, owner, operator, address, dimensions of work, and specifications describing the nature of work to be performed, materials and equipment to be used and installed and details of structural, mechanical, electrical, plumbing installations, and other utilities as well as right-of-way information, such as roadways and railways. On-site safety information is also preferably included. The pre-existing site data 240 may include all pertinent information required for the site that was pre-existing. Construction-related and maintenance-related forms, such as "Form B," may be linked in the pre-existing site data 240 and included in additional detail in the Form B libraries 244. The supplemental operations server 12 may track the life and expiration of such forms and certificates to provide notifications prior to expiration when renewal is required. The pre-existing site data 240 may also include information about job assignments, including having input data on specific questions based on limitation containment in accordance with applicable local, state, and national standards. Such job input information may also include the job ticket specifying a job number and job name assignment. A field crew may be assigned to a job number and job name assignment and the smart device being utilized by the field crew may be employed to send reminders and follow progress. Such information may be provided with a confirmation mechanism. The UI interaction and generation module 222 generates a user interface that allows the end user to specify parameters that may be utilized to generate various reports and notifications.

The pre-existing site data 240 may also include any site plans which may be any type of architectural plan, landscape architecture document, or a detailed engineering drawing of proposed improvements to a given lot. A site plan usually shows a building footprint, travel ways, parking, drainage facilities, sanitary sewer lines, water lines, trails, lighting, landscaping and garden elements, as well as other utilities. The site plan may be provided in a CAD format or other format and may include geolocationing information therein. In one implementation, the site plan may include a computerized representation, such as a computerized grid, of the utilities and the right-of-ways, including railway right-of-ways, at the location. Railway operators and other utility operators may adopt GPS mapping and locating technology to provide the ability to store and retrieve accurate location information nearly instantaneously regarding utilities. Such information may be used as part of the site plans. Furthermore, any observed inconsistencies or changes to the location information can be updated to continuously improve the quality and accuracy of the right-of-way information or other data in the pre-existing site data 240. Such information and data may include geolocationing data, including project geofence data, on desired work locations. This data which augments the pre-existing site data 240 is the acquired site data 242.

The activity inventories 246 may include all information about the status of the activities and work in the project and progress. The presentation instructions 248 may include information and data that permits a user to utilize the supplemental operations safety application 220 and navigate the features therein.

Once the parameters have been established for the generation of reports by default or by an end user utilizing the management (user) interface tools 224, the graphics data tools 226 operate on the site plan or other vector graphics data files with texture identifiers or two or three dimensional map image files specified in one or more map tiles that may be raster-based map tiles, for example. The graphics data tools 226 create the augmented data for the site plan to determine where work should occur as well as the project geofence 58, as well as the safety site plan 18. The geolocationing tools 228 interface with the geolocationing data embedded in the site plan and the geolocationing data provided on-site by the smart device, for example.

This geolocationing information supports the graphics data tools 226 and the augmentation of the site plan, including the addition of the project geofence 58. The report modules 230 may be executed to containerize and annotate the data elements to generate the required report or reports. Additionally, by way of example, the report modules 230 may generate the safety site schedule 20.

The notification/alert modules 232 may be executed to provide notifications of varying levels of urgency to the field crew, field crewmembers, or the off-site project director 96 or off-site railroad director 80, for example. The notifications and alerts may be sign related as previously discussed and include notifications and alerts about upcoming or in-progress work. The database module 234 may be executed to obtain data from the supplemental operations database 16. The field module 236 provides the necessary interface or interfaces for the field crews, and, similarly, the director module 238 provides the necessary interface or interfaces for project directors.

In the illustrated embodiment, FIG. 6 also includes an operating system 250 that includes input device driver(s) 252 and a display module 254. In some embodiments, as illustrated, input device drivers 252 and a display module 254 are part of the operating system 250 even when the supplemental operations safety application 220 is an application separate from the operating system 250. The input device drivers 252 may include drivers for translating signals from a keyboard, mouse, touchpad, tablet, touch screen, gyroscope, or accelerometer, for example. A user may use one or more of these input device drivers 252, which send signals to their corresponding device driver, in combination with the display module 254 to interact with the supplemental operations safety application 220. The device driver then translates the signals into user input data that is provided to the UI interaction and generation module 222.

As discussed, during the construction or maintenance of railroads, or other projects, it is necessary to coordinate work at a particular site. The supplemental safety system 10 presented herein ensures timely and safe execution of a plan via the safety site plan 18 and the safety site schedule 20 through the use of a geolocation-based system that provides reminders, plans, and verification of work completed, among other features.

It should be appreciated, however, that the teachings presented herein are not limited to construction and maintenance related to performing work within a railway right-of-way for a railroad. More generally, the teachings presented herein are applicable to any industry using a schedule for executing work. Such industries include agricultural, manufacturing, construction, oil and gas, transportation, as well as service industries, including delivery and security. By way of example and not by way of limitation, with respect to the agricultural industry, in forestry, logging may need to be completed in a particular area of forest and the systems presented herein can assist with the calendaring and site safety by ensuring communication between stakeholders. In the manufacturing industry at a steel plant, repairs and maintenance may be coordinated, including, importantly, temporarily closing part of the plant and ensuring the plant is cleared and ready to reopen when the repairs and maintenance are complete. In security services, the systems presented herein may ensure that an area is properly patrolled during a shift and vacated at the end of the shift, for example.

Figure 7:
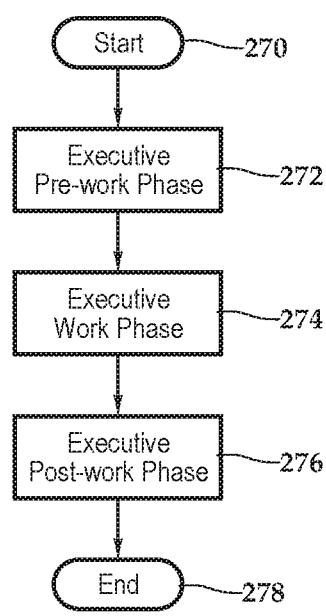
FIG. 7 is a flowchart depicting one embodiment of a method for utilizing a supplemental safety system and providing supplemental safety, according to the teachings presented herein.

Referring now to FIG. 7, one embodiment of a method for utilizing a supplemental safety system and providing supplemental safety is shown. The methodology starts at block 270 where a safety site plan of a site is created. As previously discussed, the safety site plan may be a site plan of the site augmented with locationing information for work with a project geofence therearound. At block 270, a safety site schedule for the site is also created. As also previously discussed, the safety site schedule may be a work schedule for the site augmented with schedule data relative to the project pre-work phase, the project work phase, and the project post-work phase. At block 272, the methodology executes the pre-work phase. That is, in response to the safety site schedule being in the project pre-work phase, the methodology calendars the elements for the project work phase and periodically reminds the elements of the project work phase. At block 274, the methodology executes the project work phase. In response to the safety site schedule being in the project work phase, attendance of the elements within the project geofence is verified. Additionally, workflow updates are received relative to the elements within the project geofence. At block 276, the post-work phase methodology is executed. In response to the safety site schedule being in the project post-work phase, clearance is verified of the elements from the project geofence and work completion updates are received relative to the plurality of elements within the project geofence.

Figure 8:
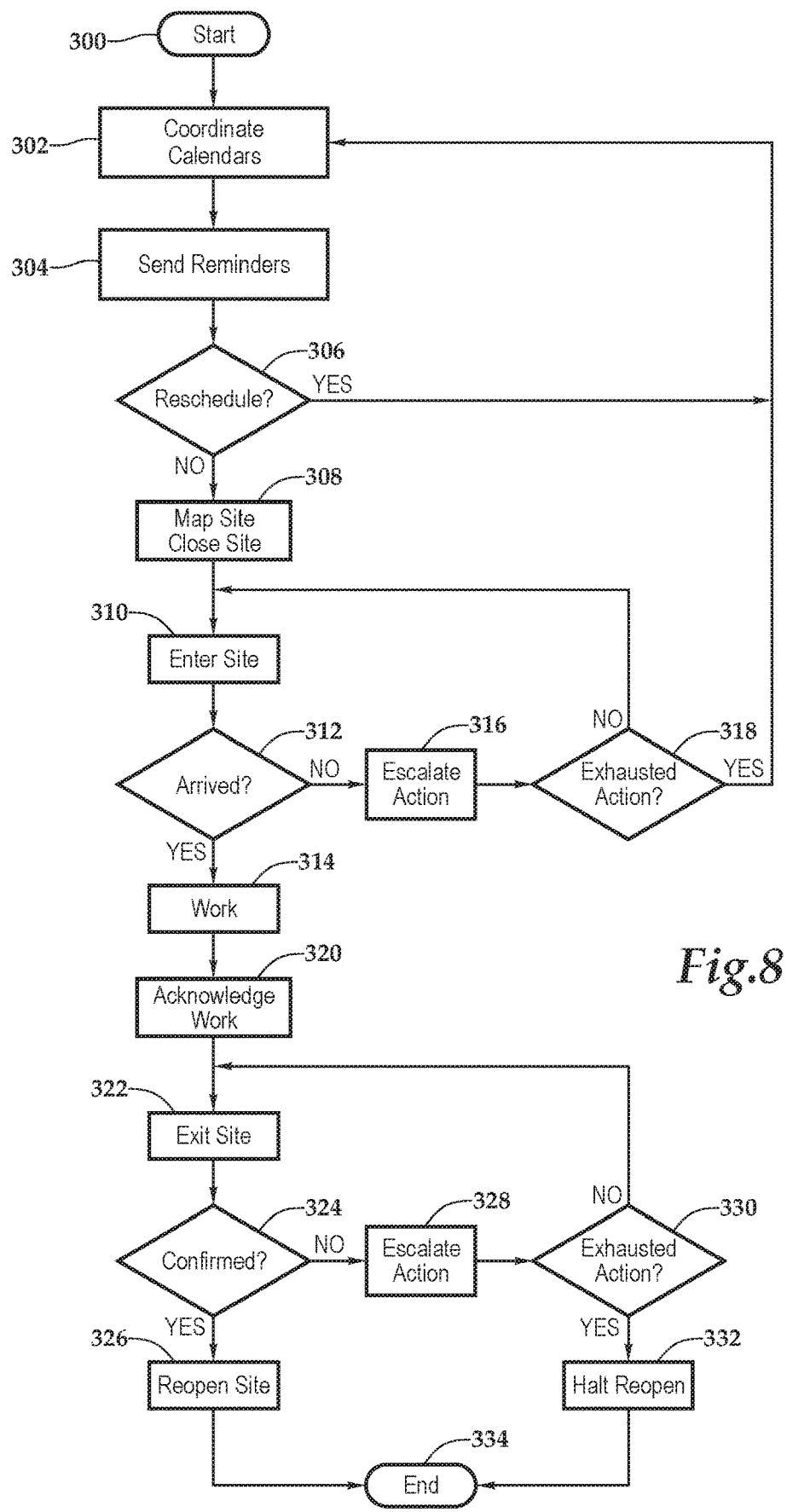
FIG. 8 is a flowchart depicting one implementation of the methodology presented in FIG. 7.

Referring to FIG. 8, one implementation of a method for utilizing a supplemental safety system and providing supplemental safety is shown. The methodology starts at block 300 where the safety site plan of a site and a safety site schedule for the site are created and maintained. At block 302, the methodology coordinates calendars between various elements that will be performing work at the site. The calendar coordination may occur through invites, which are in-app or by email, for example. Alternatively, the calendar coordination may occur via text and telephone.

At block 304, following the calendar coordination and selection of dates for the work to be performed at the site, the methodology provides reminders to the elements of the upcoming project. The reminders may occur through invites, which are in-app or by email, for example. Alternatively, the reminders may occur via text and telephone. At this time or during the previous step, the safety site schedule may be integrated into a calendar associated with the respective smart devices associated with the elements to further aid reminders as well as tracking of progress of the project once work begins. At decision block 306, if rescheduling is necessary due to unavailability of one or more elements, then the methodology returns to block 302; otherwise, the methodology advances to block 308.

At block 308, the mapping of the site that forms a portion of the safety site plan is reviewed and finalized. If necessary, any required changes to the safety site plan may be made at this time. Also, at block 308, the site is closed for the project, which may involve construction and/or maintenance, for example. At block 310, the elements enter the site. At decision block 312, arrival of the necessary elements is verified. The arrival verification may involve an in-app notification sent from an element at the site to the supplemental operations server. The notification may be stamped with GPS data that is compared to the project geofence. If all of the elements have arrived, then the methodology advances to block 314. On the other hand, if all of the elements have not arrived, then the methodology advances to block 316, where escalating action is taken to contact any missing elements so that the project may continue.

In one implementation, elements must report to duty no later than one hour before the project begins. If an element does not report to duty, then a series of notifications via text or email may begin before a manager or director is notified to continue the escalation. At decision block 318, if the escalation of action is exhausted and no alternative is available, then the work is temporarily delayed, and the methodology returns to calendar coordination at block 302. On the other hand, if the missing elements are notified and arrival is pending, then the methodology returns to block 310.

Returning to the discussion of block 314, with all necessary elements arrived, the work on the project begins with elements or supervisors, such as managers or directors, providing acknowledgment of the work at block 320. In one implementation, acknowledgement of the work occurs through an in-app menu of options on the various smart devices. Once the work and acknowledgement of the work are completed, then at block 322, the elements exit the site. At decision block 324, confirmation of the exit is obtained in a manner similar to the confirmation of the arrival. The exit verification may involve an in-app notification sent from an element leaving the site to the supplemental operations server. The notification may be stamped with GPS data that is compared to the project geofence to ensure the element has left. If all elements are confirmed to have left the site, then the site may be reopened at block 326. If, on the other hand, not all elements have left the site, than a series of escalating actions with notifications and supervisor involvement, if necessary, occur at block 328. At decision block 330, if all action is not exhausted, then the methodology returns to block 322; otherwise the reopening is halted at block 332. From each of block 326 and block 332, the methodology advances to the end at block 334.

The order of execution or performance of the methods and techniques illustrated and described herein is not essential, unless otherwise specified. That is, elements of the methods and techniques may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A railroad supplemental safety system, the system comprising:
    a plurality of railroad elements including at least one of construction equipment and maintenance equipment, each element equipped with GPS data capability;
    a project geofence providing a virtual boundary around a railroad site, the project geofence interacting with a the plurality of railroad elements via GPS data originating from the plurality of railroad elements;
    a safety site plan of a the railroad site, the safety site plan being a site plan of the railroad site augmented with locationing information for work by the plurality of railroad elements with a the project geofence therearound;
    a safety site schedule for the railroad site, the safety site schedule being a work schedule for the railroad site augmented with schedule data relative to a project pre-work phase, a project work phase, and a project post-work phase; and
    non-transitory memory accessible to a processor, the non-transitory memory including processor-executable instructions that, when executed, by the processor cause the system to:
        maintain the safety site plan including updating the safety site plan based on the GPS data originating from the plurality of railroad elements,
        maintain the safety site schedule including updating the safety site schedule based on the GPS data originating from the plurality of railroad elements,
        in response to the safety site schedule being in the project pre-work phase, calendar the plurality of railroad elements for the project work phase,
        in response to the safety site schedule being in the project pre-work phase, periodically remind the plurality of railroad elements of the project work phase,
        in response to the safety site schedule being in the project work phase, verify attendance of the plurality of railroad elements within the project geofence,
        in response to the safety site schedule being in the project work phase, receive workflow updates relative to the plurality of railroad elements within the project geofence,
        in response to the safety site schedule being in the project post-work phase, verify clearance of the plurality of railroad elements from the project geofence, and
        in response to the safety site schedule being in the project post-work phase, receive work completion updates relative to the plurality of railroad elements within the project geofence.

2. The system as recited in claim 1, wherein the processor-executable instructions further comprise processor-executable instructions that, when executed, by the processor cause the system to:
    in response to the safety site schedule being in the project pre-work phase, re-calendaring the plurality of railroad elements for the project work phase if one of the plurality of railroad elements is unavailable.

3. The system as recited in claim 1, wherein the processor-executable instructions further comprise processor-executable instructions that, when executed, by the processor cause the system to:
    in response to the safety site schedule being in the project pre-work phase, cancelling the plurality of railroad elements for the project work phase if one of the plurality of railroad elements is unavailable.

4. The system as recited in claim 1, wherein the processor-executable instructions further comprise processor-executable instructions that, when executed, by the processor cause the system to:
    receive a notification from a particular element, the particular element being one of the plurality of railroad elements,
    verify attendance of the particular element within the project geofence by analyzing the project geofence and the notification, the notification including global positioning system data.

5. The system as recited in claim 1, wherein the processor-executable instructions further comprise processor-executable instructions that, when executed, by the processor cause the system to:
    receive a notification from the site, the notification including information about the workflow of a particular element, the particular element being one of the plurality of railroad elements, and
    update workflow.

6. The system as recited in claim 1, wherein the processor-executable instructions further comprise processor-executable instructions that, when executed, by the processor cause the system to:
receive a notification from a particular element, the particular element being one of the plurality of railroad elements,
verify clearance of the particular elements from the project geofence by analyzing the project geofence and the notification, the notification including global positioning system data.

7. The system as recited in claim 1, wherein the processor-executable instructions further comprise processor-executable instructions that, when executed, by the processor cause the system to:
receive a notification from the railroad site, the notification including information about the work completion of a particular element, the particular element being one of the plurality of railroad elements, and
update work completion.

8. The system as recited in claim 1, wherein the processor-executable instructions further comprise processor-executable instructions that, when executed, by the processor cause the system to:
send a notification to a particular element, the particular element being one of the plurality of railroad elements, the notification being selected from the group consisting of in-app, text, email, and phone.

9. The system as recited in claim 1, wherein the plurality of railroad elements further comprise elements selected from the group consisting of project directors, project managers, field crewmembers, and utilities.

10. A method for providing railroad supplemental safety, the method comprising:
providing a plurality of railroad elements including at least one of construction equipment and maintenance equipment, each element equipped with GPS data capability;
creating a project geofence providing a virtual boundary around a railroad site, the project geofence interacting with a the plurality of railroad elements via GPS data originating from the plurality of elements;
creating a safety site plan of the railroad site, the safety site plan being a site plan of the railroad site augmented with locationing information for work with a project geofence therearound;
creating a safety site schedule for the railroad site, the safety site schedule being a work schedule for the railroad site augmented with schedule data relative to a project pre-work phase, a project work phase, and a project post-work phase;
updating the safety site plan and the safety site schedule based on the GPS data originating from the plurality of railroad elements;
in response to the safety site schedule being in the project pre-work phase, calendaring the plurality of railroad elements for the project work phase;
in response to the safety site schedule being in the project pre-work phase, periodically reminding the plurality of railroad elements of the project work phase;
in response to the safety site schedule being in the project work phase, verifying attendance of the plurality of railroad elements within the project geofence;
in response to the safety site schedule being in the project work phase, receiving workflow updates relative to the plurality of railroad elements within the project geofence;
in response to the safety site schedule being in the project post-work phase, verifying clearance of the plurality of railroad elements from the project geofence; and
in response to the safety site schedule being in the project post-work phase, receiving work completion updates relative to the plurality of railroad elements within the project geofence.

11. A method for providing railroad supplemental safety, the method comprising:
providing a plurality of railroad elements including at least one of construction equipment and maintenance equipment, each element equipped with GPS data capability, the plurality of railroad elements further comprise elements selected from the group consisting of project directors, project managers, field crewmembers, and utilities;
creating a project geofence providing a virtual boundary around a railroad site, the project geofence interacting with the plurality of railroad elements via GPS data originating from the plurality of railroad elements;
creating a safety site plan of the railroad site, the safety site plan being a site plan of the railroad site augmented with locationing information for work with a project geofence therearound;
creating a safety site schedule for the railroad site, the safety site schedule being a work schedule for the railroad site augmented with schedule data relative to a project pre-work phase, a project work phase, and a project post-work phase;
updating the safety site plan and the safety site schedule based on the GPS data originating from the plurality of railroad elements;
in response to the safety site schedule being in the project pre-work phase, calendaring the plurality of railroad elements for the project work phase;
in response to the safety site schedule being in the project pre-work phase, periodically reminding the plurality of railroad elements of the project work phase;
in response to the safety site schedule being in the project work phase, verifying attendance of the plurality of railroad elements within the project geofence;
in response to the safety site schedule being in the project work phase, receiving workflow updates relative to the plurality of railroad elements within the project geofence;
in response to the safety site schedule being in the project post-work phase, verifying clearance of the plurality of railroad elements from the project geofence; and
in response to the safety site schedule being in the project post-work phase, receiving work completion updates relative to the plurality of railroad elements within the project geofence.

* * * * *